United States Patent
Lippens et al.

[11] Patent Number: 6,134,870
[45] Date of Patent: Oct. 24, 2000

[54] BALE DISCHARGE MEANS FOR A RECTANGULAR BALER

[75] Inventors: Christiaan A. C. Lippens, Sint-Laureins; Adrianus Naaktgeboren, Varsenare; Emiel R. L. Marichael, Tielt; Marnix J. Schoonheere, Ichtegem, all of Belgium

[73] Assignee: New Holland North America, Inc., New Holland, Pa.

[21] Appl. No.: 09/353,388

[22] Filed: Jul. 15, 1999

[51] Int. Cl.[7] .............................. A01D 39/00; B65B 13/20
[52] U.S. Cl. .................................... 56/432; 56/434; 100/8
[58] Field of Search ........................... 56/341, 445, 438, 56/344, 440, 442, 443, 446, 455, 432, 434, 433, 435; 100/5, 87, 88, 89, 189, 179, 240, 8, 100

[56] References Cited

U.S. PATENT DOCUMENTS

| | | | |
|---|---|---|---|
| 4,270,446 | 6/1981 | Molitorisz | 100/8 |
| 4,683,815 | 8/1987 | Van Ryswyk | 100/88 |
| 5,159,876 | 11/1992 | Olin | 100/88 |
| 5,263,410 | 11/1993 | Olin | 100/88 |
| 5,842,335 | 12/1998 | Esau | 56/341 |
| 6,026,741 | 2/2000 | Lippens et al. | 100/41 |

FOREIGN PATENT DOCUMENTS 2194483  3/1988  United Kingdom .

*Primary Examiner*—Robert E. Pezzuto
*Attorney, Agent, or Firm*—J. William Stader; Larry W. Miller

[57] ABSTRACT

An agricultural baler comprises a baling chamber and pick-up device for collecting crop material from a field and feeding it to conveyor mechanism which transports it into the baling chamber. A plunger reciprocates therein for compressing the crop material to a package and a tying mechanism encircles the package with one or more strands of tying material, thereby forming a completed bale. The baler comprises bale discharge device disposed at the outlet of the baling chamber, the bale discharge device being movable between an extended position for receiving the completed bale and depositing it onto the field and a retracted position for reducing the overall length of the baler. In the retracted position, a rear portion of the bale discharge device is rested on a support on top of the baling chamber. The discharge device are held in their retracted position by the rear portion itself.

22 Claims, 5 Drawing Sheets

BALE DISCHARGE MEANS FOR A RECTANGULAR BALER

BACKGROUND ON INVENTION

1. Field of Art

The present invention relates to agricultural balers for picking up crop material such as hay or straw from the field and forming it into rectangular packages. More particularly the invention relates to means installed at the rear of the machine for receiving the formed package and depositing the same onto the field.

2. Description of Prior Art

Conventionally rectangular agricultural balers comprise a frame which is traveled on a pair of wheels over a field for picking up therefrom hay, straw or silage grass and feeding such crop material to a baling chamber in which it is compressed to parallelepiped packages under action of a plunger which reciprocates inside the baling chamber. When the packages have reached a predetermined length a tying mechanism is operated to encircle the completed package with a plurality of strands and to knot the strand ends together to form a finished bale which will be ejected out of the baler.

As the outlet of the baling chamber is at a substantial height above the field, there is a risk that bales get damaged by their fall from the baling chamber, e.g. because the impact breaks some or all of the strands. Commonly this problem has been solved by providing a guide or slide means at the exit of the baling chamber for reducing the height from which the bale is released onto the field and/or giving a wanted orientation to the bale. In the art such apparatus usually is referred to as "bale chute". Examples thereof can be found in WO-A-96/29 195 and EP-A-0 771 522.

The bale chute usually constitutes the rearmost part of the baler. Most national road regulations usually put serious constraints on such rear extensions, such that the operator is forced to pivot the bale chute upwardly before he is allowed to travel the baler from one field to another by public roads. To alleviate this task the documents cited above teach the use of a hydraulic cylinder to rotate the bale chute into its transport position. However it is observed that, once in its transport position, the apparatus still requires hydraulic pressure to keep the bale chute from returning to its lower, working position. Accidental leaks or breakage of the hydraulic lines on the baler or between the tractor and the baler will lower the bale chute which consequently forms a vehicle extension which is dangerous to the other traffic. Therefore additional means such as bolts or chains are required to lock the bale chute in its transport position. However the use of these locking means is easily neglected or forgotten, exposing the operator to hazardous situations during road travel.

Therefore there is a need for a simple, yet reliable means for raising the bale chute into its upper position and keeping it therein.

Furthermore, it has been observed that while maneuvering on a field, the tail portion constituted by the bale chute is particularly vulnerable to damages caused by collisions with objects on or around the field. In particular the deposited bales may form serious obstacles while the baler is driven backwards, e.g. to realign the pick-up to the windrow. Especially freshly deposited bales are dangerous because they are still close to the rear end of the baler and consequently hidden by the body of the baler. When the baler is driven backwards the bale chute may hit the bale on the ground and the impact may seriously deform this chute such that it becomes impossible to lift it up to its transport position. The operator usually is aware of this danger but as he is not inclined to leave the tractor at every maneuver, he usually relies on what he can see from his rear view mirrors. However, because of the baler itself blocking part of his view, he cannot always tell whether a bale has been deposited immediately behind the baler. Hence there also is a need for means informing him of such possibly hazardous situation before he reverses the baler.

There are also constraints on the level of the bale chute above the field. Sufficient clearance should be provided to prevent contact with the ground when one or both wheels of the baler runs into a hole. On the other hand too high an exit level of the chute makes the impact of the bale too great, such that it may fall apart. Even with reduced heights, problems may occur because the bale starts rotating during its fall and the acquired momentum may rotate the bale further after its edge hit the soil, thereby making the bale tip over and putting it to rest on its front end. The consequent mixture of properly deposited and upright bales on the same field later complicates the handling and collection of the bales.

Consequently, there also exists a need for a system ensuring the proper and consistent deposit of the bales, without however exposing the bale chute to increased risks of damages by contact with the ground.

SUMMARY OF INVENTION

According to one aspect of the present invention there is provided an agricultural baler comprising a baling chamber, a pick up means for collecting crop material from a field and feeding it rearwardly, a conveyor means for receiving the crop material collected by said pick up means and feeding it into said baling chamber, a plunger means reciprocating in said baling chamber for compressing the crop material therein to a package, a tying means for encircling said package with one or more strands of tying material, thereby forming a completed bale and a bale discharge means disposed at the outlet of said baling chamber.

Said bale discharge means being movable between an extended position for receiving said completed bale and depositing it onto the field and a retracted position for reducing the overall length of said baler. Said discharge means characterized in that, in said retracted position, at least a rear portion of said bale discharge means is rested on top of said baling chamber.

According to a further aspect of the present invention there is provided an agricultural baler further comprising a discharge means characterized in that said bale discharge means comprise sensor means for sensing the movement of said bale and generating a signal indicative of said movement.

According to a still further of the present invention there is provided an agricultural baler further comprising a bale discharge means characterized in that said bale discharge means comprises a rear portion which is movable between an upper, bale sustaining and a lower, bale discharging position.

BRIEF DESCRIPTION OF THE DRAWINGS

The invention will now be described in further detail with reference to the following drawings, in which.

DETAILED DESCRIPTION OF THE INVENTION

The terms "front", "rear", "forward", "rearward", "left" and "right" used throughout this description are determined with respect to the normal direction of travel of the machine in operation. However they are not to be construed as limiting terms.

Figure 1:
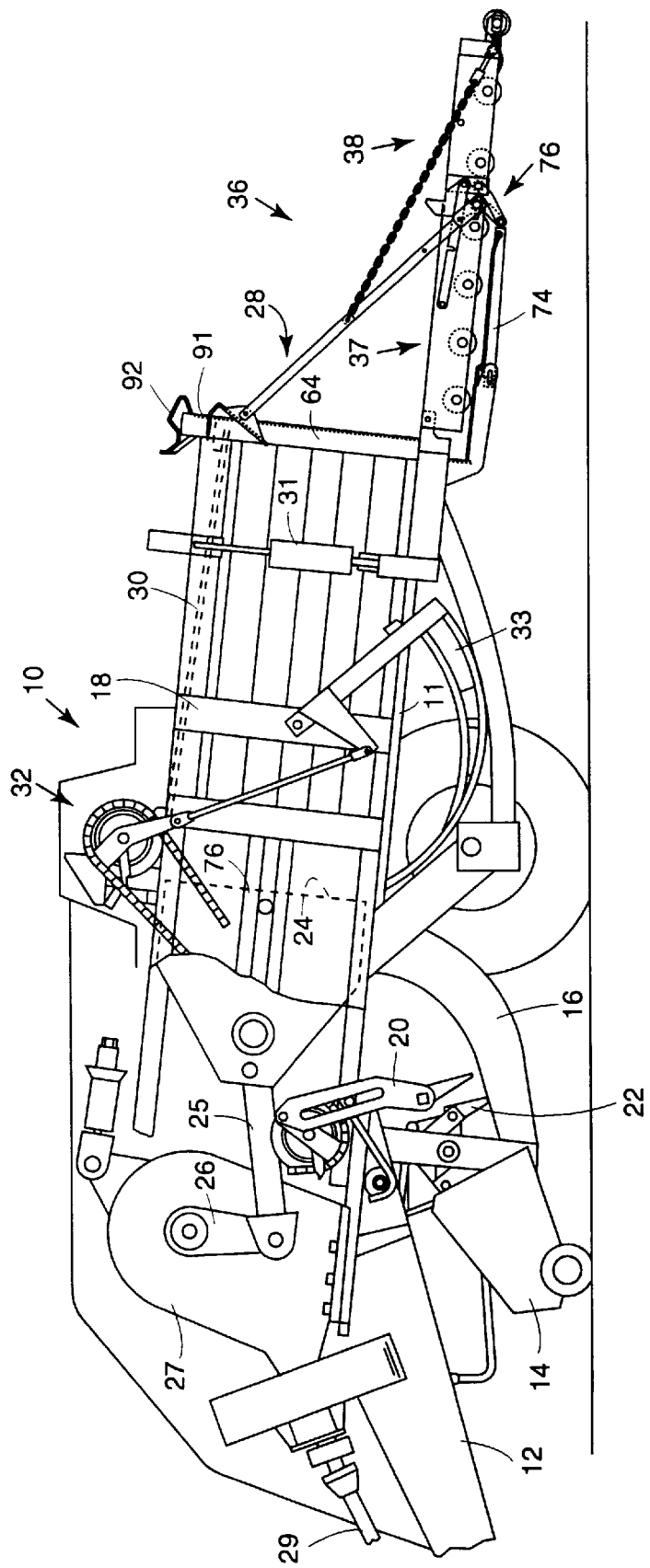
FIG. 1 is a side elevational view of an agricultural baler equipped with a bale discharge means according to the invention.

FIG. 1 shows an agricultural baler 10 comprising a frame 11 which is equipped with a forwardly extending tongue 12 provided with hitch means (not shown) at its front end for coupling the baler 10 to a towing tractor. A conventional pick-up assembly 14 lifts windrowed crop material off the field as the baler 10 is traveled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 rotated by a shaft 29 which is connected to the PTO shaft of the tractor. The reciprocating plunger 24 pushes each new charge introduced into the baling chamber 18 rearwardly and forms the subsequent charges into a package of crop material, which is pushed by the plunger 24 toward a rearmost discharge aperture 28 of the chamber 18.

The baling chamber 18 comprises at least one movable wall portion 30 of which the position can be adjusted to vary the cross section of the aperture 28. Reduction of this cross section will increase the resistance to rearward movement of the crop packages and hence the density of the crop material contained therein. Similarly an increase in cross section will reduce the resistance and the density of the newly formed packages. The position of the wall portion 30 is controlled by a pair of actuators in the form of hydraulic cylinders 31 (only one shown in FIG. 1) which are installed between the frame 11 and the wall portion 30.

Each package is securely bound in its final compacted form by a tying mechanism 32 before leaving the confines of the baling chamber 18. The length of each bale produced by the baler 10 can be adjustably predetermined by conventional means not shown. The tying mechanism 32 comprises a series of periodically actuated needles 33 which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
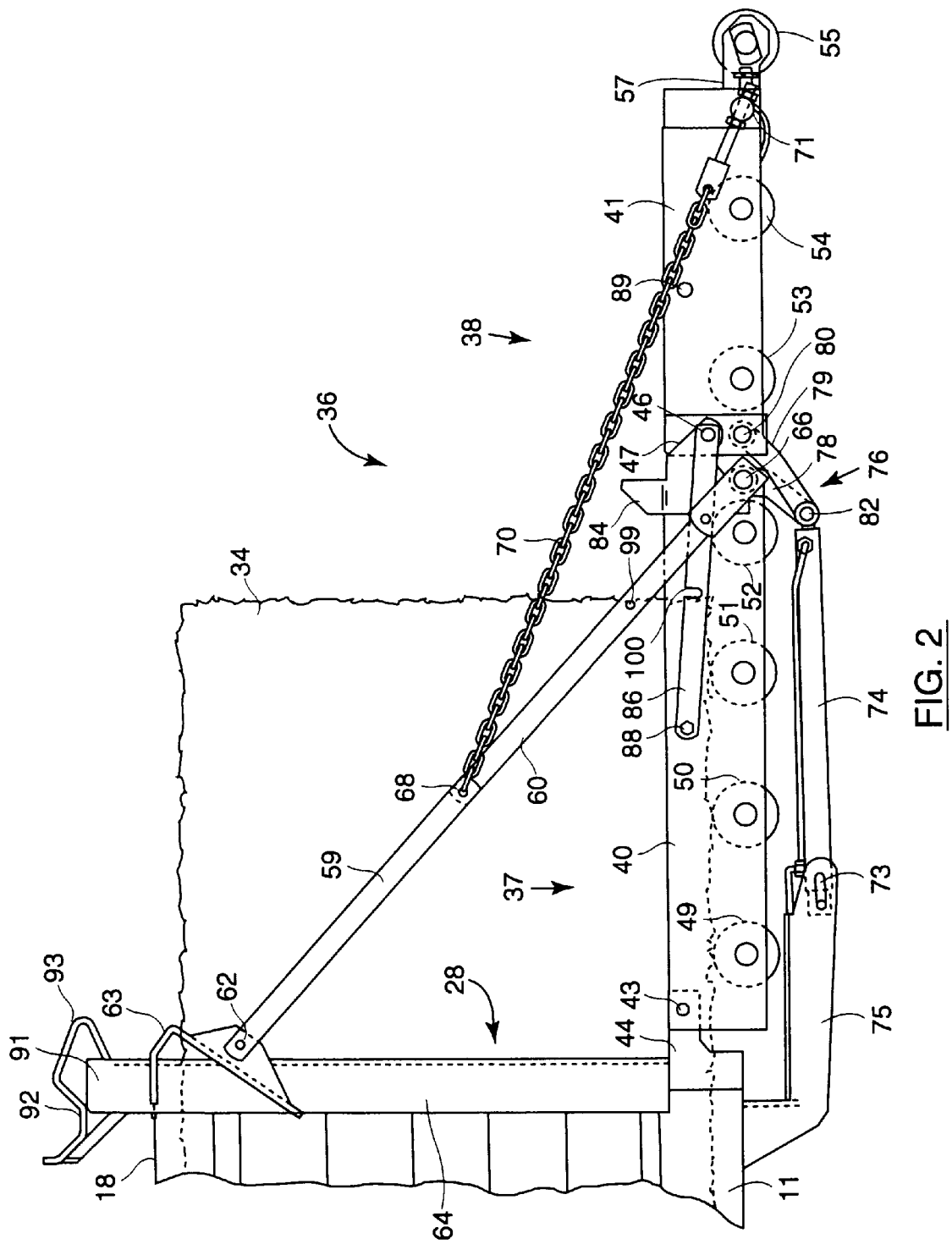
FIG. 2 is an enlarged, side elevational view of the bale discharge means of FIG. 1.

The baler is equipped with bale discharge means 36 in the form of a bale chute, mounted to the rear of the frame 11, adjacent the discharge aperture 28 of the baling chamber 18. The completed bale is received thereon and sustained thereby at least until the rear end of the bale has completely left the confines of the baling chamber 18. FIG. 2 shows the discharge means 36 in further detail. They embrace a front chute portion 37 and a rear chute portion 38. The front portion 37 comprises a rectangular frame 40, which is attached by a pair of pivot pins 43 to lugs 44 welded onto the rear end of the baler frame 11. In turn, the rear portion 38 comprises a rectangular frame 41 which is mounted via a pair of pivot pins 46 to lugs 47 welded onto the rear end of the front chute frame 40.

The front chute portion 37 contains a set of four transversely arranged rollers 49–52 which are journaled in the sides of the front frame 40. The rear chute portion 38 comprises two rollers 53, 54 mounted within the rear frame 41 and one roller 55, journaled between two extensions 57 of this rear frame 41. The latter roller 55 constitutes the most rearward part of the baler during baling operations.

When the bale discharge means 36 are in their operating position, the rear end of the front chute portion 37 is sustained by a linkage means on each side of the chute frame 40. Each linkage means comprises a pair of pivotally interconnected pull bars 59, 60. The upper pull bar 59 has an upper end which is pivotally connected by a bolt assembly 62 to a support 63 on the side of the baling chamber 18. The supports 63 are welded to upright beams 64 which encompass the discharge aperture 28.

The lower end of the lower pull bar 60 has an aperture which is mounted over a tubular extension 66 on the side of the front chute frame 40. The upper end of the bar 60 is pivotally linked at connection point 68 to the lower end of the upper pull bar 59.

The rear end of the rear chute portion 38 is sustained by a pair of chains 70 extending between pins 71 on the sides of the rear frame 41 and the connection point 68.

The bale discharge means 36 can be moved into a transport position by means of an actuator in the form of a hydraulic cylinder 74, which is mounted below the front chute portion 37, between a support 75 welded to the rear end of the baler frame 11, and a lever arrangement 76. This arrangement comprises a first lever 78 having a top end mounted to a pivot which is coaxial with the tubular extension 66 and a second lever 79 having a top end mounted to a pivot 80 which is attached to the front end of the rear chute frame 41, at a level below the pivot pins 46. A single pin 82 extends through the lower ends of both levers 78, 79 and the rod end of the hydraulic cylinder 74. The cylinder is linked via an appropriate valve (not shown) on the left hand side of the baler frame 11 to the hydraulic circuitry of the baler, e.g. to the portion thereof which controls the hydraulic cylinder 31 of the baling chamber 18.

The front chute portion 37 is provided with a pair of upright, inwardly inclined ears 84, welded to the sides of the chute frame 40 for limiting the pivotal movement of the rear chute portion 38 to the front portion 37. A locking member 86 is pivotally attached by a bolt means 88 to the left hand side of the front chute frame 40. A pin 89 is provided on the left hand side of the rear chute frame 41 for sliding thereover the aperture in the rear end of the locking member 86 when the rear chute portion is lifted to its upright position, as will described hereafter. In FIG. 2 however, the aperture is slid over the pivot pin 46.

The discharge aperture 28 is surmounted by a horizontal beam 91 resting on the upright beams 64. To the top of the horizontal beam 91 are welded two cradle supports 92 for receiving therein the roller 54 of the bale discharge means 36 when the latter is moved into its transport position. The supports 92 have an inclined surface 93 for guiding the roller 54 into the cradle.

The rear roller 55 has at the outer end of its left journal a sensor plate 95 which is rotated in unison with the roller 55. A proximity sensor 96, mounted in a support 97, is directed to the edges of the sensor plate 95 and generates a signal which is indicative of the movement of the roller 55, and hence of the movement of the bale resting on said roller.

FIG. 2 shows the bale discharge means 36 in the position they have when no bale is resting thereon, or when a bale is resting on the front chute portion 37 only. The weight of the front portion and the bale then stretch the linkage constituted by the pull bars 59 and 60, while the chains 70 hold the rear chute portion 38 in alignment with the front portion 37. As such the bale which is leaving the discharge aperture 28, is properly sustained until the end of bale has left the confines of the baling chamber 18.

Figure 3:
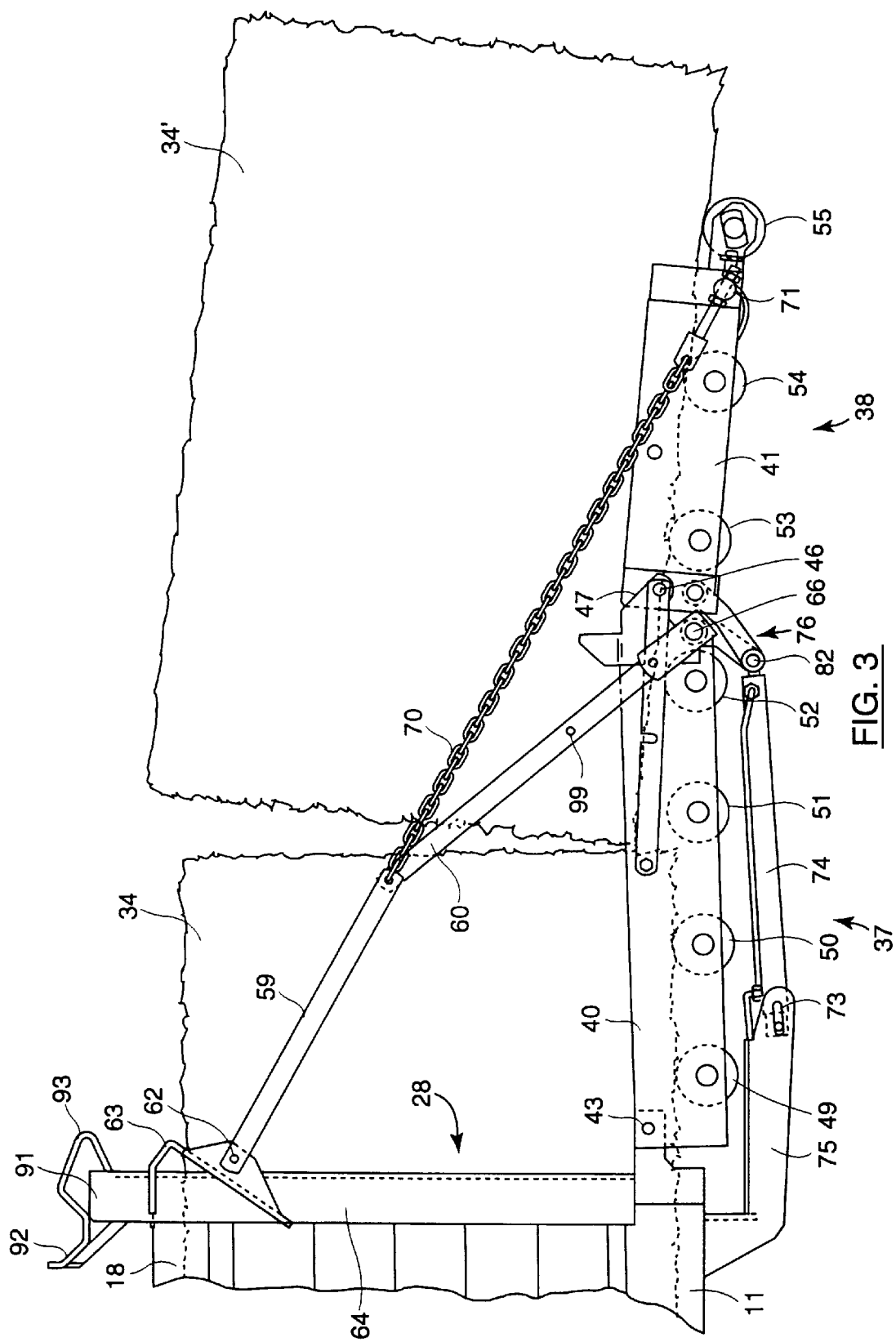
FIG. 3 is a side view of the bale discharge means with a load on its rear portion.

When the completed bale is pushed rearwardly further to and along the rear portion 38, there comes a time that the weight of the bale is fully assumed by this rear portion 38. The chains 70 are then fully tensioned and the forces on the linkage point 68 align the upper pull bars 59 with the chains 70, as shown in FIG. 3. The linkage formed by the upper rods 59 and the chains 70 is now fully stretched, while the alignment between the bars 59 and 60 is broken. The rear chute portion 38 assumes a new, inclined position, with its rear end closer to the ground. This position facilitates the gentle deposit of the bale on the field. It eliminates the risk that the bale turns over because of the momentum acquired by the bale during its release from the bale discharge means.

Figure 4:
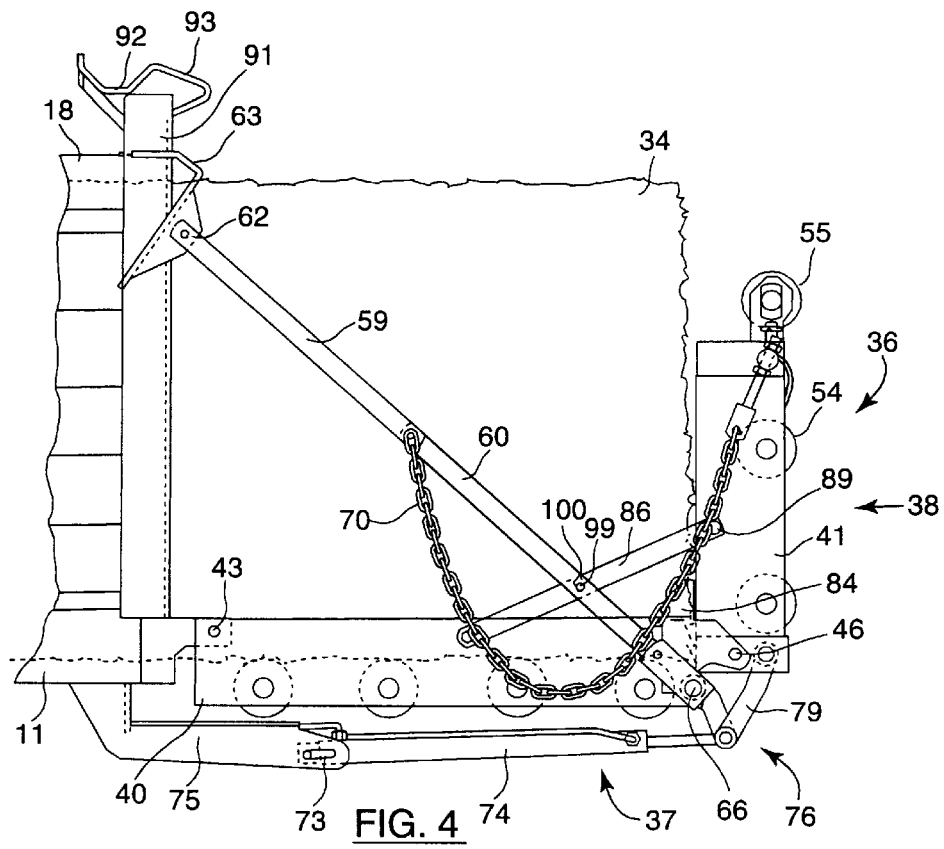
FIG. 4 is a side view of the bale discharge means with the rear portion in an upright position.

FIG. 4 illustrates the discharge means 36 with the rear portion 37 in an upright position. The hydraulic cylinder 74 has been extended, thereby rotating the lever arrangement 76 about the pivot coaxial with extension 66. The lever 79 pushes the rear chute portion 38 upwardly and rotates it about the pivot pins 46 until the rear chute frame 41 contacts the ears 84 on the front chute frame 40. It is now possible to secure the rear portion 38 in this upright position by mounting the rear end of locking member 86 over the pin 89 on the rear chute frame 41. Simultaneously a pin 99 on the lower pull bar 60 is caught in a notch of the locking member 86. The position of the lower pull bar 60 is thereby secured, preventing further movement of the upper pull bar 59 and the front chute frame 40. In this manner the position of both the front and the rear portions 37, 38 is consolidated. This may prove advantageous when the baler 10 is transported while a bale is still resting on the front portion of the discharge means 36.

Figure 5:
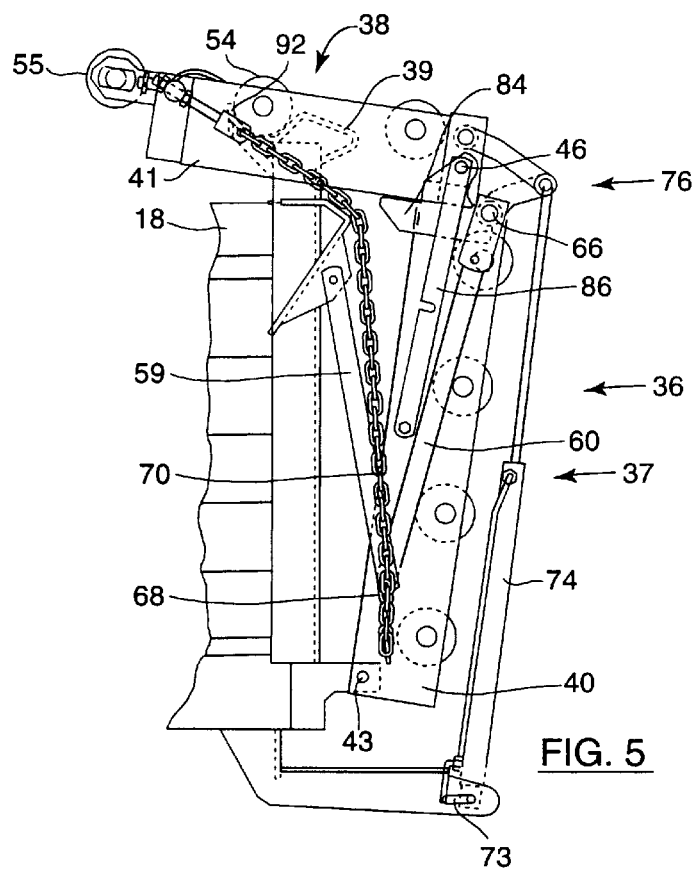
FIG. 5 is a side view of the bale discharge means in their fully retracted position.
Figure 6:
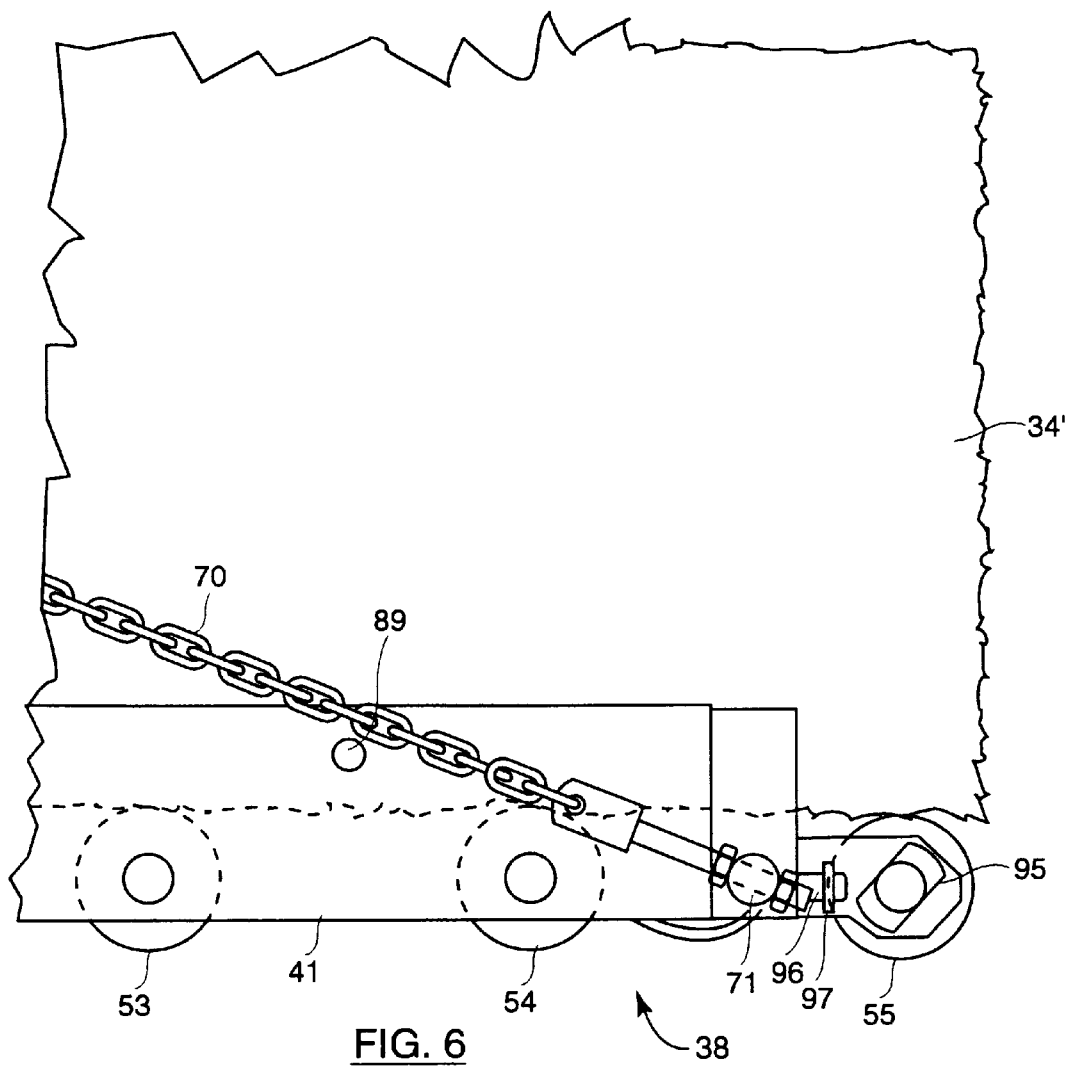
FIG. 6 is a side view of the rear end of said rear portion, showing means for sensing the movement of a bale thereon.

FIG. 5 illustrates the position of the discharge means 36 for road travel. The locking member 86 is not mounted over pin 89 and the pin 99 is not caught in the notch 100, such that it does not hinder the movement of any portion of the bale discharge means. The rear end of the locking member 86 is mounted over the pivot pin 46. To arrive from the position in FIG. 4 to the position in FIG. 5 the hydraulic cylinder 74 is extended further, while the lever arrangement 76 cannot rotate further because of the ears 84 which limit the travel of the rear chute frame 41. Consequently the combined front and rear portions 37, 38 are pivoted upwardly and rotated counterclockwise as seen from the left side about the pivot pins 43. The rear portion 38 is rotated over the baling chamber 18 and its second last roller 54 contacts the inclined surfaces 93 of the cradle supports 92. The roller 54 rolls over this surface and finally falls into the cradle section of the supports 92. The rear chute portion 38 is now held in position above the baling chamber 18 and the cradle arrangement keeps the discharge means 36 from dropping back, even when no hydraulic pressure is available at the cylinder 74.

For returning the front and rear chute portions 36, 37 to their operative, extended position, the cylinder 74 is actuated to retract, such that the front portion 37 is pulled back and the roller 54 is forced out of the cradle supports 92. The right angle between the front and rear chute frames 40, 41 is maintained until the front chute portion 37 has reached it lowermost position, defined by the stretched pull bars 59, 60. Then the further retraction of the cylinder 74 effects the rotation of the rear chute frame 41 until it is in alignment with the front frame 40.

It is observed that the front end of the cylinder 74 is mounted in oblong holes 73 of the support 75 for permitting relative movement between the chute portions 37 and 38 as described with respect to FIGS. 2 and 3.

Possible alternative embodiments of the bale discharge structure involve a set of chains replacing the pull bars 59 and 60. It is also conceivable to use an electrical actuator instead of a hydraulic cylinder 74 for moving the discharge means 36 between an extended and a retracted position. It is also conceivable to use a similar retraction structure for a bale chute having less or no rollers 49–55, e.g. wherein the bales are guided along solid plates. In this case the rear portion of the bale chute may be provided with members caught in a similar cradle structure on top of the baling chamber 18. In the illustrated embodiment the ears 84 are disposed to limit the minimum angle between front and rear chute frames 40, 41 to a right angle. However other positions for the ears 84 may be used to obtain other limit angles.

The movement of the bale on the rear chute portion 38 is sensed by the proximity sensor 96. The roller 55 is rotated by the bottom of the bale. Initially the bale is pushed rearwardly at the rate of the reciprocating plunger 24 or at an even lower rate if no fresh crop material is fed into the baling chamber. The consequent movement of the bale over the rear chute portion 38 engenders short pulse turns, sometimes containing only one pulse with long intervals in-between.

However, when the center of gravity of the bale has reached the rear chute portion 38 the chains 70 are stretched thereby increasing the inclination of this chute portion. The speed of the bale is likely to increase and finally, when the gravity center reaches the final roller 55, the bale tips over and slides over the roller 55 onto the field. This quick movement of the bale rotates the roller 55 at a high rate and engenders a long pulse train with a greater frequency. Hence, the signal from the proximity sensor 96 during the actual discharge of a bale onto the field can be distinguished easily from the signal generated during the remainder of the baling cycle.

The output of the sensor 96 is fed to electronic circuitry including a microprocessor which is programmed to generate a warning when the signal is indicative of a fresh deposit of a bale. This warning signal is passed on to the operator in the cab of the towing tractor. Thereby he is informed of the presence of a new bale immediately behind the baler 10, which might form a hindrance in case he wants to ride the baler backwards, e.g. for realignment of the pick-up assembly 14 with the wind-row on the field. The warning signal may be acoustic or visual, e.g. a message or an icon on the screen of the bale command monitor. Advantageously the software is incorporated into the microprocessor controlling the other baler functions.

What is claimed is:

1. An agricultural baler comprising:

a baling chamber;

pick up means for collecting crop material from a field and feeding it rearwardly;

conveyor means for receiving the crop material collected by said pick up means and feeding it into said baling chamber;

plunger means reciprocating in said baling chamber for compressing the crop material therein to a package;

tying means for encircling said package with one or more strands of tying material, thereby forming a completed bale; and bale discharge means disposed at the outlet of said baling chamber, said bale discharge means being movable between an extended position for receiving said completed bale and depositing it onto the field and a retracted position for reducing the overall length of said baler;

wherein said discharge means further comprises in said retracted position, at least a rear portion of said bale discharge means is rested on top of said baling chamber.

2. An agricultural baler according to claim 1, wherein said baler further comprises actuator means for moving said bale discharge means between said extended and said retracted positions.

3. An agricultural baler according to claim 2, wherein said bale discharge means further comprises a front portion which is movable between a substantially horizontal portion, when said discharge means are in their extended position, and a substantially vertical position, blocking the outlet of said bale chamber, when said discharge means are in their retracted position.

4. An agricultural baler according to claim 3, wherein:

said rear portion is mounted for pivotment to said front portion; and said baler comprises means for preventing pivotment of said rear portion to said front portion beyond a predetermined angle.

5. An agricultural baler according to claim 4, wherein said angle is substantially equal to a right angle.

6. An agricultural baler according to claim 5, wherein said bale discharge means comprises locking means for securing said rear portion in a fixed position to said front portion, when said rear portion has been pivoted to said predetermined angle.

7. An agricultural baler according to claim 6, wherein said actuator means comprises a single actuator for moving said front portion and said rear portion.

8. An agricultural baler according to claim 7, wherein said bale discharge means comprises:

a first lever having one end mounted for pivotment to said front portion;

a second lever having one end mounted for pivotment to said rear portion;

the other end of said first lever and of said second lever being interconnected and being engaged by said single actuator.

9. An agricultural baler according to claim 8, wherein:

said rear portion comprises at least one roller; and cradle means are provided on said baling chamber for receiving said roller when said bale discharge means are in their retracted position.

10. An agricultural baler comprising:

a baling chamber;

pick-up means for collecting crop material from a field and feeding it rearwardly;

conveyor means for receiving the crop material collected by said pick up means and feeding it into said baling chamber;

plunger means reciprocating in said baling chamber for compressing the crop material therein to a package;

tying means for encircling said package with one or more strands of tying material, thereby forming a completed bale; and bale discharge means disposed at the outlet of said baling chamber for receiving said completed bale and depositing it onto the field, wherein said bale discharge means further comprises sensor means for sensing the movement of said bale and generating a signal indicative of said movement.

11. An agricultural baler according to claim 10, wherein said discharge means comprises at least one roller for movement thereover of said bale and said sensor means sense the rotation of said roller.

12. An agricultural baler according to claim 11, wherein said sensor means comprises a proximity sensor directed to a member rotated in unison with said roller.

13. An agricultural baler according to claim 12, wherein said sensor means further comprises signal processing means for receiving said signals and generating a warning signal when said sensor signal is indicative of the deposit of a bale from said bale discharge means.

14. An agricultural baler according to claim 13, wherein said signal processing means is operable to generate said warning signal when said sensor means sense an accelerated movement of said bale.

15. An agricultural baler according to claim 14, wherein said signal processing means is operable to generate said warning signal when sensor means sense an accelerated rotation of said roller.

16. An agricultural baler comprising:

a baling chamber;

pick up means for collecting crop material from a field and feeding it rearwardly;

conveyor means for receiving the crop material collected by said pick up means and feeding it into said baling chamber;

plunger means reciprocating in said baling chamber for compressing the crop material therein to a package;

tying means for encircling said package with one or more strands of tying material, thereby forming a completed bale; and bale discharge means disposed at the outlet of said baling chamber for receiving said completed bale and depositing it onto the field wherein said bale discharge means further comprises a rear portion which is movable between an upper, bale sustaining and a lower, bale discharging position.

17. An agricultural baler according to claim 16, wherein said rear portion is movable into said lower position under the force of the weight of a baler resting thereon.

18. An agricultural baler according to claim 17, characterized in that the rear end of said rear portion is connected to said bale case by a linkage means which is stretched when said rear portion is in said bale discharging position.

19. An agricultural baler according to claim 18, wherein:

said bale discharging means further comprises a front portion, to which said rear portion is pivotally mounted; and interconnecting means connect the rear end of said front portion to said linkage means at a point between said bale case and the rear end of said rear portion.

20. An agricultural baler according to claim 19, wherein:

said linkage means comprises an upper and a lower member which are pivotally linked to each at a linkage point, and said interconnecting means comprise a further member linking the rear end of said front portion to said linkage point.

21. An agricultural baler according to claim 20, wherein said upper member and said filter member are aligned when no bale is resting on said rear portion.

22. An agricultural baler according to claim 21, wherein said upper member is constituted by a pull bar, said lower member by a chain and said further member by a pull bar.

\* \* \* \* \*